(12) United States Patent
Diaz et al.

(10) Patent No.: US 12,314,273 B2
(45) Date of Patent: *May 27, 2025

(54) PREFETCHING USING DYNAMIC USER MODEL TO REDUCE LATENCY

(71) Applicant: Microsoft Technology Licensing, LLC, Redmond, WA (US)

(72) Inventors: Fernando Diaz, Brooklyn, NY (US); Ryen William White, Woodinville, WA (US); Qi Guo, San Jose, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/079,590

(22) Filed: Dec. 12, 2022

(65) Prior Publication Data
US 2023/0108358 A1    Apr. 6, 2023

Related U.S. Application Data

(63) Continuation of application No. 15/211,699, filed on Jul. 15, 2016, now Pat. No. 11,526,521.

(51) Int. Cl.
*G06F 16/2457* (2019.01)
*G06F 16/9535* (2019.01)
(Continued)

(52) U.S. Cl.
CPC .... *G06F 16/24578* (2019.01); *G06F 16/9535* (2019.01); *G06F 16/955* (2019.01); *G06F 16/9574* (2019.01)

(58) Field of Classification Search
None
See application file for complete search history.

(56) References Cited

U.S. PATENT DOCUMENTS

| 7,975,025 | B1 | 7/2011 | Szabo et al. |
| 8,156,419 | B2 * | 4/2012 | Choudhary ......... G06F 16/9574 |
| | | | 715/209 |

(Continued)

FOREIGN PATENT DOCUMENTS

| CN | 102792244 A | 11/2012 |
| CN | 104067274 A | 9/2014 |

(Continued)

OTHER PUBLICATIONS

"First Office Action and Search Report Issued in Chinese Patent Application No. 201780043783.3", Mailed Date: Dec. 5, 2022, 22 Pages.

(Continued)

*Primary Examiner* — Hanh B Thai
(74) *Attorney, Agent, or Firm* — Schwegman Lundberg & Woessner, P.A.

(57) ABSTRACT

A device includes a memory that stores a prefetching model. A control module receives a content page including one or more links each associated with selectable content and collects data associated with the content page. The collected data includes at least one of first data indicative of respective relationships between each of the links and a viewport of the device and second data indicative of characteristics of the viewport. The control module further assigns, using the prefetching model, respective scores to each of the links based on the collected data, and selectively generates, based on the assigned scores, a request to prefetch the selectable content associated with at least one of the links.

20 Claims, 6 Drawing Sheets

(51) Int. Cl.
*G06F 16/955* (2019.01)
*G06F 16/957* (2019.01)

(56) References Cited

U.S. PATENT DOCUMENTS

| | | | | |
|---|---|---|---|---|
| 8,332,284 | B1* | 12/2012 | Runo | G06Q 30/0643 |
| | | | | 705/27.2 |
| 8,793,235 | B2* | 7/2014 | Burkard | G06F 40/143 |
| | | | | 707/705 |
| 9,239,883 | B2* | 1/2016 | Smyth | G06F 16/9535 |
| 9,571,594 | B2* | 2/2017 | Gross | G06N 7/01 |
| 9,672,285 | B2* | 6/2017 | Burkard | G06F 16/9574 |
| 9,832,253 | B2* | 11/2017 | Kapadia | G06N 7/01 |
| 10,007,933 | B2* | 6/2018 | Simeonov | G06F 16/972 |
| 10,146,842 | B2* | 12/2018 | Yeom | G06F 16/9535 |
| 10,346,900 | B1* | 7/2019 | Wilson | G06F 8/38 |
| 10,572,548 | B2* | 2/2020 | Burkard | G06F 16/9574 |
| 11,435,887 | B1* | 9/2022 | Mirho | G06Q 50/184 |
| 11,526,521 | B2 | 12/2022 | Diaz et al. | |
| 2002/0147788 | A1 | 10/2002 | Nguyen et al. | |
| 2003/0163646 | A1 | 8/2003 | Oneil | |
| 2009/0182733 | A1 | 7/2009 | Itoh | |
| 2012/0143843 | A1* | 6/2012 | Smyth | G06F 16/9535 |
| | | | | 707/707 |
| 2013/0321466 | A1* | 12/2013 | Kocienda | G01C 21/26 |
| | | | | 345/635 |
| 2014/0359074 | A1* | 12/2014 | Igelka | G06F 16/172 |
| | | | | 709/219 |
| 2014/0372511 | A1* | 12/2014 | Kapadia | G06F 16/9574 |
| | | | | 709/203 |
| 2015/0193395 | A1* | 7/2015 | Nicolaou | G06F 16/24578 |
| | | | | 707/726 |
| 2017/0147658 | A1* | 5/2017 | Yeom | G06F 16/9535 |

FOREIGN PATENT DOCUMENTS

| | | |
|---|---|---|
| WO | 2004021219 A2 | 3/2004 |
| WO | 2013101491 A1 | 7/2013 |

OTHER PUBLICATIONS

"Notice of Allowance and Search Report Issued in Chinese Patent Application No. 201780043783.3", Mailed Date: Jul. 27, 2023, 8 Pages.

Zhifang, et al., "Review of the Application of Eye Tracking Technique in Network Information Retrieval", In Journal of Information Resource Management, vol. 2, Dec. 31, 2011, pp. 95-100.

"Second Office Action Issued in Chinese Patent Application No. 201780043783.3", Mailed Date: May 12, 2023, 9 Pages.

* cited by examiner

| Feature name | Description |
| --- | --- |
| Dynamic Local | |
| $vis(x; v_t)$ | $x$ intersects $v_t$ |
| $frac(v_t; x)$ | fraction of $x$ within $v_t$ |
| $titleVis(x; v_t)$ | title of $x$ is in $v_t$ |
| $visArea(x; v_t)$ | raw area of $x$ intersecting with $v_t$ |
| $frac(x; v_t)$ | fraction of $v_t$ intersecting with $x$ |
| $dur(x; v_t)$ | duration of $x$ on screen (ms) |
| $dist(x; v_t)$ | distance of $x$ to $v_t$ |
| $relDist(x; v_t)$ | $x$ is above or below the $v_t$ |
| $numVis(x; V_t)$ | number of times $x$ has been visible |
| Dynamic Global | |
| $time(v_t; v_{t-1})$ | time difference between $v_t$ and $v_{t-1}$ |
| $dist(v_t; v_{t-1})$ | distance between $v_t$ and $v_{t-1}$ |
| $speed(v_t; v_{t-1})$ | speed of movement |
| $time(v_t; v_0)$ | total time of impression |
| $numVis(v_t; X)$ | number of items in $X$ intersecting with $v_t$ |
| $fracVis(v_t; X)$ | fraction of $X$ intersecting with $v_t$ |
| $width(v_t)$ | width of $v_t$ |
| $height(v_t)$ | height of $v_t$ |
| $x(v_t)$ | horizontal position of $v_t$ |
| $y(v_t)$ | vertical position of $v_t$ |
| $maxY(V_t)$ | maximum vertical position of $v_t$ |
| $maxAOI(V_t)$ | maximum AOI rank of $v_t$ |
| $scrolldist(V_t)$ | total scroll distance of $V_t$ |
| $upscrolls(V_t)$ | number of scrolls up |
| $downscrolls(V_t)$ | number of scrolls down |
| $scrolls(V_t)$ | number of scrolls in any direction |
| Static Local | |
| $area(x)$ | area of $x$ (in pixels) |
| $width(x)$ | width of $x$ (in pixels) |
| $height(x)$ | height of $x$ (in pixels) |
| $rank(x)$ | rank position of $x$ |
| $x(x)$ | horizontal position of $x$ |
| $y(x)$ | vertical position of $x$ |
| $vertical(x)$ | whether $x$ is a vertical result |
| $CTR(x)$ | click frequency of $x$ |
| $avgPLT(x)$ | average PLT |
| $sdPLT(x)$ | standard deviation of PLT |
| $size(x)$ | page size of $x$ |
| Static Global | |
| $ads(X)$ | $X$ has ad |
| $querySugg(X)$ | $X$ contains an query suggestion |
| $H(q)$ | $q$ click entropy computed over 1.5 years prior to the experiment. |
| $freq(q)$ | $q$ frequency |

FIG. 4

| Name | Class | Importance |
|---|---|---|
| rank($x$) | SL | 1.0000 |
| size($x$) | SL | 0.5845 |
| dur($x; v_t$) | DL | 0.3540 |
| y($x$) | SL | 0.3415 |
| height($x$) | SL | 0.2495 |
| avgPLT($x$) | SL | 0.2201 |
| sdPLT($x$) | SL | 0.2130 |
| H($q$) | SG | 0.1916 |
| freq($q$) | SG | 0.1775 |
| time($v_t; v_q$) | DG | 0.1518 |
| . | . | |
| . | . | |
| . | . | |
| upscrolls($V_t$) | DG | 0.0268 |
| width($v_t$) | DG | 0.0266 |
| titleVis($x; v_t$) | DL | 0.0265 |
| fracVis($v_t; X$) | DG | 0.0210 |
| frac($v_t; x$) | DL | 0.0104 |
| frac($x; v_t$) | DL | 0.0102 |
| scrolls($V_t$) | DG | 0.0077 |
| visArea($x; v_t$) | DL | 0.0066 |
| width($x$) | SL | 0.0026 |
| vis($x; v_t$) | DL | 0.0000 |

PREFETCHING USING DYNAMIC USER MODEL TO REDUCE LATENCY

CLAIM OF PRIORITY

This application is a continuation application of U.S. patent application Ser. No. 15/211,699, filed Jul. 15, 2016, which application is incorporated herein by reference in its entirety.

FIELD

The present disclosure relates to web browsing, and more particularly to prefetching content during web browsing.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Various devices may be used to search, browse, select, and/or view remote content via a wireless and/or wired connection to a network. For example, a device may display a search engine result page (SERP) including one or more search results, links, etc. in response to a search query provided by a user. The user may select one of the search results to retrieve content from an address (e.g., a Uniform Resource Locator, or URL) associated with the selected search result, to access media content (e.g., audio or video) associated with the search result, etc.

A user may experience a delay between selecting a desired search result and actually being able to view the associated content. For example, the device may generate a request to retrieve the content in response to the selection, transmit the request via a network, and receive the content thereafter. In some devices, this latency may be reduced by prefetching content associated with one or more of the search results on the SERP. In other words, the device may attempt to predict which of the search results is likely to be elected by the user and generate a request to prefetch the associated content prior to the user actually selecting the search result. Accordingly, some or all of the associated content may be delivered to the device prior to selection by the user.

SUMMARY

A device includes a memory that stores a prefetching model. A control module receives a content page including one or more links each associated with selectable content and collects data associated with the content page. The collected data includes at least one of first data indicative of respective relationships between each of the links and a viewport of the device and second data indicative of characteristics of the viewport. The control module further assigns, using the prefetching model, respective scores to each of the links based on the collected data, and selectively generates, based on the assigned scores, a request to prefetch the selectable content associated with at least one of the links.

A method of operating a device includes receiving a content page including one or more links each associated with selectable content, and collecting data associated with the content page. The collected data includes at least one of first data indicative of respective relationships between each of the links and a viewport of the device and second data indicative of characteristics of the viewport. The method further includes assigning, using a prefetching model, respective scores to each of the links based on the collected data, and selectively generating, based on the assigned scores, a request to prefetch content associated with at least one of the links.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF DRAWINGS

FIG. 4 is a table of example features input to a prefetching model according to the present disclosure.

In the drawings, reference numbers may be reused to identify similar and/or identical elements.

DESCRIPTION

Devices used for content browsing may implement prefetching to reduce latency experienced by a user. For example, a device may implement a static model that attempts to predict the likelihood that the user will select a given search result on a search engine result page (SERP). In some examples, the model may prefetch a search result based on which of the search results on a given SERP was most often selected by other users, which search of the search results provided in response to a given query was most often selected by other users, which of the search results was most often selected by the current user, the highest ranked search result (e.g., the top link on the SERP), etc.

If the incorrect content is prefetched due to an inaccurate prediction (i.e., content corresponding to a search result other than the search result that is ultimately selected), additional resources may be consumed. For example, when the incorrect content is prefetched, latency is not reduced and may actually be increased and additional bandwidth may be used. Accurate prefetching may be especially important in mobile devices due to higher page load times, data use and bandwidth restrictions, and battery consumption.

Accordingly, prefetching systems and methods according to the principles of the present disclosure implement a dynamic model to predict user selection of search results for prefetching. In one example, the dynamic model predicts user selection based on a relationship between the search results and a viewport of the device. For example, which search results of the SERP are currently being viewed by the user, respective positions and/or sizes of the search results, etc. may be dependent upon characteristics of the viewport including, but not limited to, a position of the viewport relative to the SERP, an orientation of the viewport, a zoom level of the viewport, and/or user preferences or settings associated with the viewport. Although described with respect to selection of search results, the prefetching systems and methods of the present disclosure may also be applied to other suitable selectable content including, but not limited to, selection of any link, content, etc. on a web page or other interface presented to a user on a display of a device. For example only, a web page or other interface presented to the user may include links to other web pages, links to content (e.g., audio files, video files, or other downloadable content), links that initiate further functions, etc.

The prefetching systems and methods described herein may include collecting data associated with user behavior that may be indicative of search result selection, modeling the collected data to establish a relationship between the user behavior and search result selection, and predicting the most likely search result to be selected by the user based on modeling results. For example, data collection may include monitoring user interaction with the device and viewport while search results are being displayed, such as scrolling and zooming, as well as interaction with other device interfaces (e.g., in some devices, a cursor, sensors such as eye movement sensors, etc.).

Data indicative of the user interaction is provided to one or more models. For example, the models may include a dynamic model, corresponding to data associated with dynamic user behavior relative to displayed search results, and a static model, corresponding to data associated with fixed characteristics of the search results, such as search result rank or position. Modeling includes both generating the model and providing the collected data to the model during browsing. For example, the model may be generated based on the collection of historic, statistical data, aggregated for a plurality of users, associating user behavior with search result selection. The model may be generated offline and stored on the device, and may be updated periodically based on user behavior.

During browsing, the collected data is input to the model and the model generates one or more outputs indicative of which search result should be prefetched by the device. For example, the model may implement one or more decision trees, weighting algorithms, etc. In one example, the output of the model may include scores assigned to one or more of the search results currently within the viewport of the device. Each of the scores may correspond to a likelihood that the respective search result will be selected by the user. The scores may correspond to running, dynamic values while the user browses the SERP. In other words, the scores may be continuously adjusted as the user interacts with the viewport or other inputs of the device.

Predicting the most likely search result to be selected by the user based on modeling results includes making prefetching decisions based on the outputs of the model. For example, the device may monitor the scores of each of the search results and generate a request to prefetch one or more of the search results based on the scores. In one example, the device prefetches only a single search result. For example, the device may prefetch the search result having the highest score, the first search result to have a score that exceeds a prefetch threshold, the search result having the highest score after a predetermined period (e.g., corresponding to a time since the SERP was provided or the viewport position was adjusted), etc. In some examples, the scores, threshold, predetermined period, etc. may be adjusted or reset each time the viewport is adjusted. For example, the prefetch threshold may be fixed or may increase or decrease as the time since the last user interaction with the device increases. In some examples, the device may perform other operations for one or more of the search results (e.g., resolving Domain Name System, or DNS, entries) without actually prefetching the search results.

In this manner, prefetching according to the principles of the present disclosure reduces latency associated with browsing content using a mobile device. Further, the accuracy of the prefetching performed according to the principles of the present disclosure may be increased relative to conventional prefetching implementations, thereby reducing consumption of resources associated with the prefetching (e.g., data usage, bandwidth, battery charge, etc.).

Figure 1:
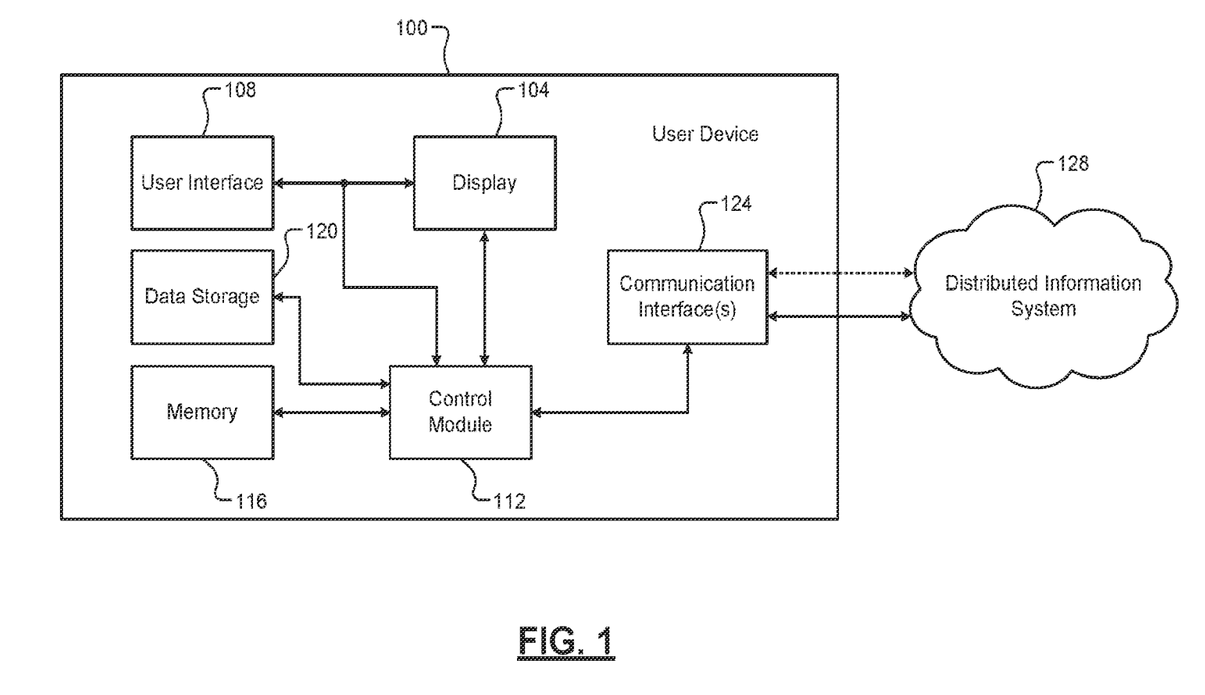
FIG. 1 is an example user device implementing a prefetching model according to the present disclosure.

Referring now to FIG. 1, an example user device 100 according to the principles of the present disclosure is shown. The device 100 may correspond to user devices including, but not limited to, a smartphone, tablet computer, e-reader, laptop computer, or other mobile device, a desktop computer, a gaming console, set top box, or other media device in communication with a television or other display, etc. In some examples, the device 100 does not include an input for controlling a cursor shown on a display 104.

The device 100 includes the display 104, a user interface 108, a control module 112, memory 116 (e.g., for short-term data access such as loaded application data during processing) and/or data storage 120 (e.g., for long-term storage of user data, program data, etc.), and a communication interface 124. The user interface 108 may include, for example only, a microphone for receiving voice inputs and commands, buttons or other manual inputs, a stylus, a mouse, a keyboard, a speaker, a touchscreen interface of the display 104, etc. The memory 116 may include volatile and/or non-volatile semiconductor memory. The data storage 120 may include a hard disk drive, a solid state drive, etc. For example only, the prefetching model of the present disclosure may be stored in the memory 116 and/or the data storage 120.

The device 100 communicates with a distributed information system (e.g., one or more of a local or wide area network including a base station or access point, a cellular or other mobile telephone network, the Internet, etc.) via the communication interface 124. For example, the communication interface 124 may be configured to communicate via a wired and/or wireless connection. In examples, the communication interface 124 may include one or more of a Wi-Fi interface, a cellular or other mobile telephone interface, a Bluetooth interface, a wired Ethernet interface, and/or other suitable communication interfaces.

The control module 112 may be configured to implement the prefetching systems and methods according to the principles of the present disclosure. For example, a user of the device 100 inputs a search query into a search engine interface via the user interface 108. In one example, the user interface 108 and the display 104 together implement a touchscreen interface and the user inputs the search query using an on-screen keyboard provided on the display 104. The device 100 (e.g., using the control module 112) provides the search query to a search engine via the communication interface 124 and the distributed information system 128. The device 100 receives a corresponding search engine result page (SERP) and displays the SERP to the user within a viewport of the display 104. Although described with respect to the SERP, the device 100 may display any suitable content page in response to an action by the user and the prefetching principles of the present disclosure as described below may be applied to selectable content on the content page.

The SERP may be larger than the viewport of the display 104, and all of the search results of the SERP may not be displayed at the same time. The user may use the touchscreen interface of the display 104 to scroll the viewport up and down relative to the SERP to view the entire SERP.

Data indicative of the SERP and the interaction of the user with the display 104 is provided to the control module 112. For example, the data may include both static and dynamic data as described below in more detail. The static data may include data associated with fixed characteristics of the search results and the SERP as provided on the display 104, such as search result rank or position. Conversely, the dynamic data may include data associated with user interaction with the viewport of the display 104. Example dynamic data includes, but is not limited to, position of the viewport relative to the SERP, scrolling, a duration that the viewport has been in a current position, etc. In some examples, the dynamic data may include cursor movement, eye movement, etc.

The control module 112 provides the collected data as inputs to the prefetching model. The model generates one or more outputs indicative of which search result on the SERP should be prefetched by the device 100. For example, the output of the model may include scores assigned to one or more of the search results currently within the viewport of the display 104. The control module 112 determines whether to generate a prefetch request based on the scores assigned to the search results, and selectively provides the prefetch request to the search engine via the communication interface 124. The search engine provides the content associated with the prefetched search result to the device 100. For example, the control module 112 may store the content in memory 116.

When the user actually selects a search result, the control module 112 determines whether the selected search result corresponds to the prefetched search result. If the selected search result matches the prefetched search result, the control module 112 retrieves the content from the memory 116 and provides the content to the user via the display 104. Conversely, if the selected search result does not match the prefetched search result, the control module 112 generates a new request to retrieve the content associated with the selected search result from the distributed information system 128. The control module 112 may update the model according to the results of the prefetching operation (e.g., whether the prefetched search result matched the selected search result).

Figure 2:
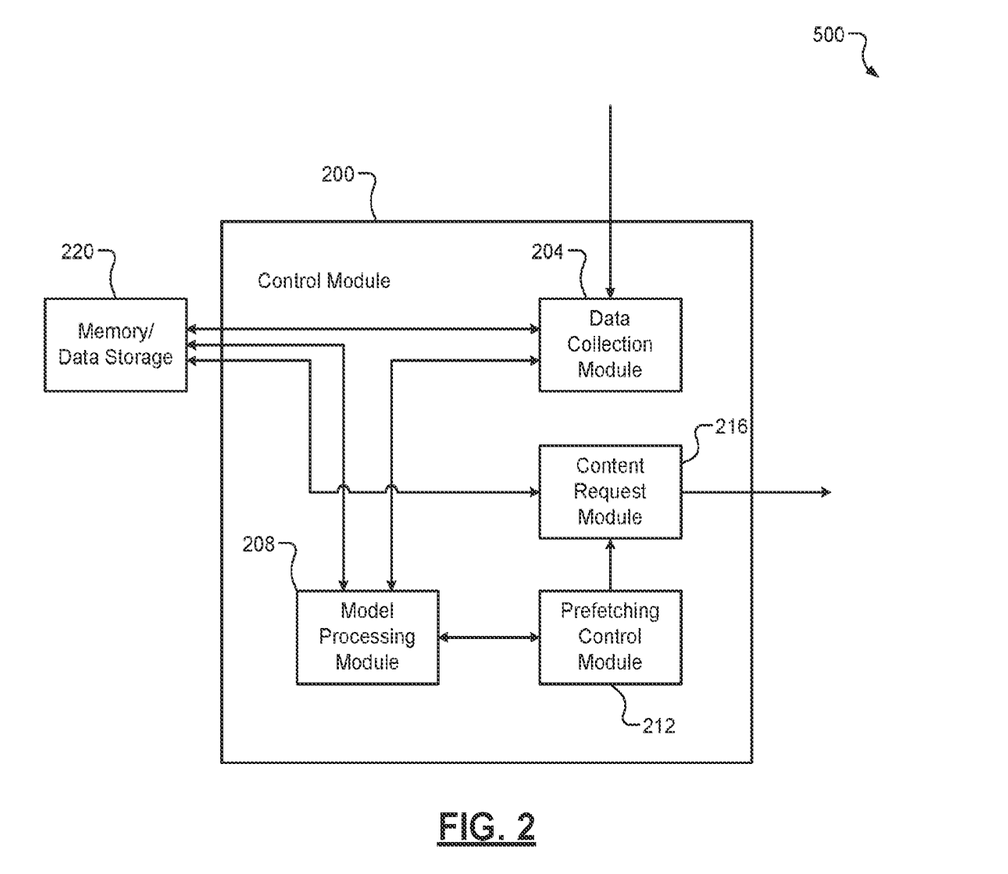
FIG. 2 is an example control module implementing a prefetching model according to the present disclosure.

Referring now to FIG. 2, an example control module 200 includes a data collection module 204, a model processing module 208, a prefetching control module 212, and a content request module 216. The data collection module 204 collects data that may predictive of which search result the user is likely to select from a SERP. The data may include both static and dynamic data associated with a current search (e.g., including, but not limited to, characteristics of the SERP, the display 104, and viewport, user behavior, etc.), as well as historic data (e.g., retrieved from memory/data storage 220). For example, the data collection module 204 may monitor user behavior associated with the display 104 during browsing of a SERP. The data collection module 204 provides the collected data to the model processing module 208, and/or may provide the data for storage in the memory/data storage 220.

The model processing module 208 receives the collected data from the data collection module 204 and/or retrieves stored collected data (e.g., including the historic data) from the memory/data storage 220. The model processing module 208 may also retrieve the prefetching model from the memory/data storage 220. The model processing module 208 provides the collected data to the prefetching model as inputs and executes the prefetching model accordingly. In an example, the prefetching model outputs scores assigned to the search results currently within the viewport of the display 104. The prefetching model may continuous adjust the scores as the user interacts with the display 104.

The model processing module 208 provides the scores to the prefetching control module 212. The prefetching control module 212 monitors the scores provided by the model processing module 208 and selectively generates a prefetch request based on the scores. The prefetching control module 212 provides the prefetch request to the content request module 216.

The content request module 216 provides the prefetch request to the search engine to retrieve the associated content. The content request module 216 may store the retrieved content in the memory/data storage 220. When the user selects a search result from the SERP, the content request module 216 receives an indication of the selection and determines whether the selected search result corresponds to the prefetched search result. The content request module 216 retrieves the content from the memory/data storage 220 or provides a new request to the search engine based on whether the selected search result matches the prefetched content, and provides the corresponding content to the display 104.

Figure 3:
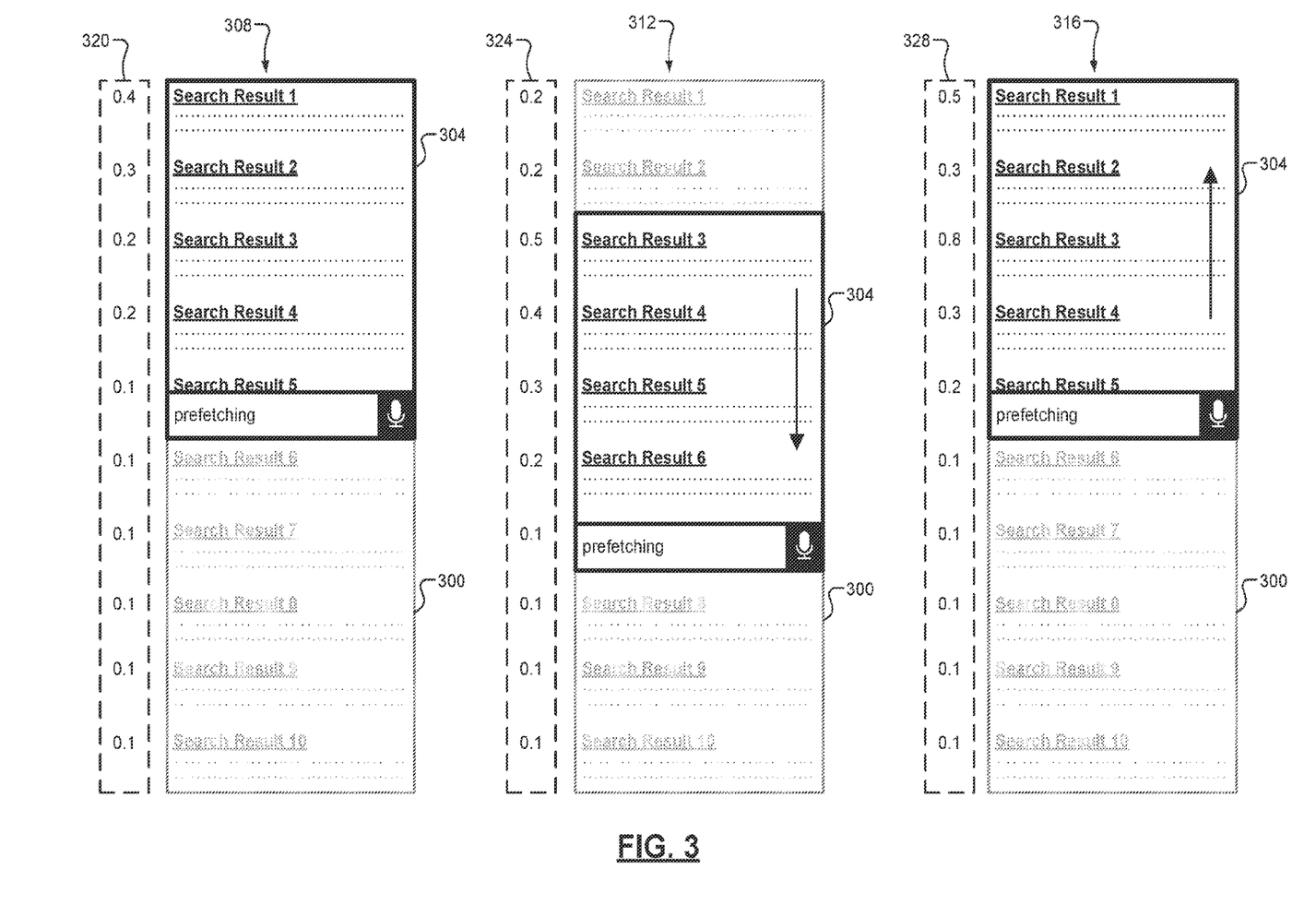
FIG. 3 illustrates example movement of a viewport relative to a search engine result page according to the present disclosure.

Referring now to FIG. 3, example operation of the prefetching control module 212 is described for a search engine result page (SERP) 300 and a viewport 304. At 308, the viewport 304 is shown in a first position at a first time relative to the SERP 300 being loaded and displayed. For example only, the first time may correspond to 0 seconds (i.e., a time that the SERP 300 is initially loaded). At 312, the viewport 304 is shown in a second position at a second time (e.g., 5 seconds after the SERP 300 is initially loaded). For example only, the second position is a result of the user scrolling the viewport 304 downward from the first position. At 316, the viewport 304 is shown in a third position at a third time (e.g., 10 seconds after the SERP 300 is initially loaded). For example only, the third position may be the same position as the first position (i.e., a top of the SERP 300). In other words, the third position may be a result of the user scrolling the viewport 304 upward to the first position.

Each of the search results (e.g., search results 1 through 10) is assigned a respective score. For example only, scores assigned to the search results at the first time, the second time, and the third time are shown at 320, 324, and 328, respectively. In other words, the scores may be continuously adjusted and updated (e.g., by the model processing module 208) as the user interacts with the viewport 304 during browsing. The scores are provided to the prefetching control module 212 accordingly. In one example the scores may range between 0.1 and 1.0. In example, the scores may be based at least in part on a respective time that each search result is within the viewport 304 (i.e., viewable by the user).

The prefetching control module 212 selectively determines whether to prefetch the content associated with one or more of the search results based on the scores. For example only, the prefetching control module 212 may compare the scores to a prefetching threshold and generate a prefetch request based on whether one of the scores is equal to or greater than the threshold. For example only, the threshold may be 0.8. In some examples, the threshold may vary over time. For example, the threshold may be 0.8 at 0 seconds, 0.7 at 5 seconds, and 0.6 at 10 seconds. Conversely, the threshold may be 0.8 at 0 seconds, and 0.9 after 5 seconds. In other words, the threshold may be configured to increase or decrease as a duration that the SERP 300 has been loaded increases.

Accordingly, the prefetch threshold can be configured to balance the frequency and likelihood of prefetching with the accuracy of the prefetching. For example, decreasing the prefetch threshold increases the frequency of prefetching while also decreasing the accuracy of prefetching. Conversely, increasing the prefetch threshold decreases the frequency of prefetching while also increasing the accuracy of the prefetching. In this manner, systems and methods according to the present disclosure can be configured to balance browsing efficiency (i.e., reducing latency and load times) with resource consumption (i.e., data, bandwidth, and battery power usage).

FIG. 4 shows a table 400 of example quantified "features" indicative of the SERP 300, the interaction between the user and the SERP 300 (i.e., user behavior, including scrolling), etc. For example, the collected data as described in FIG. 2 is converted to the features by the model processing module 208, the data collection module 204, etc. prior to being input to the prefetching model. The features include both static and dynamic features. The static and dynamic features may each be further categorized as global or local features. For example, static features (and data) correspond to fixed characteristics of the search results and the SERP. In other words, the static features do not change over time. Conversely, the dynamic features correspond to characteristics that may change over time (e.g., as the user interacts with the viewport 304). Global features correspond to features of the SERP 300 that are common across all of the search results. Conversely, local features correspond to features that are specific to a particular search result. For example, each search result may have an associated area of interest (AOI). The AOI may include a title of the search result, a brief description of the search result, an image associated with the search result, etc.

In the table 400, the dynamic local features include, for example only, features associated the respective AOI x for each search result relative to a plurality of viewport positions $V_t$ (e.g., including past viewport positions and the current viewport position $v_t$, where $V_t = \{v_0, \ldots, v_t\}$). For example, the features may include, but are not limited to, an indication of whether the AOI x intersects the viewport position, a fraction of the AOI x within the viewport in the respective position, whether the title of the AOI x is within the viewport, a raw area of the AOI x within the viewport, a fraction of the viewport intersecting with the AOI x, a duration (e.g., in ms) that the AOI x is visible within the viewport, a distance between the AOI x and the viewport, an indication of whether the AOI x is above or below the viewport, and a number of times the AOI x has been visible within the viewport.

The dynamic global features include, but are not limited to, a time difference between the current viewport position and a previous viewport position, a distance between the current viewport position and the previous viewport position, a speed of movement between the current viewport position and the previous viewport position, a total time between an initial viewport position and the current viewport position (e.g., corresponding to a total time the SERP 300 has been loaded), a total number of AOIs X intersecting with the viewport, a fraction of the total number of AOIs X within the viewport, a width of the viewport, a height of the viewport, a horizontal position of the viewport relative to the SERP 300, a vertical position of the viewport relative to the SERP 300, a maximum vertical position of the viewport, a maximum rank (i.e., overall position relative to the SERP 300) of the AOIs in the viewport, a total scroll distance of the viewport, a number of upward scrolls performed by the user, a number of downward scrolls performed by the user, and a total number of scrolls in any direction performed by the user.

The static local features include, but are not limited to, area of the AOI x (e.g., in pixels), width of the AOI x (e.g., in pixels), height of the AOI x (e.g., in pixels), rank of the AOI x, horizontal position of the AOI x, vertical position of AOI x, whether the AOI x is a vertical result, historic click frequency of the AOI x, average page load time (PLT) of the AOI x, standard deviation of the PLT of the AOI x, and page size of the AOI x.

Static global features include, but are not limited to, an indication of whether the SERP 300 includes an advertisement, an indication of whether the SERP 300 includes a query suggestion, a click entropy $H(q)$ associated with the SERP 300 (e.g., as determined over a predetermined period, such as 1.5 years), and a click frequency $freq(q)$ associated with the SERP 300.

The prefetching model according to the principles of the present disclosure is constructed according to one or more of the features shown in FIG. 4. For example, the data collection module 204 selectively collects data indicative of one or more of the above features, the data collection module 204 and/or the model processing module 208 converts the data to respective inputs corresponding to each of the features, and the features are provided to the prefetching model. The prefetching model calculates the respective scores for each of the search results based on these input features.

Figure 5:
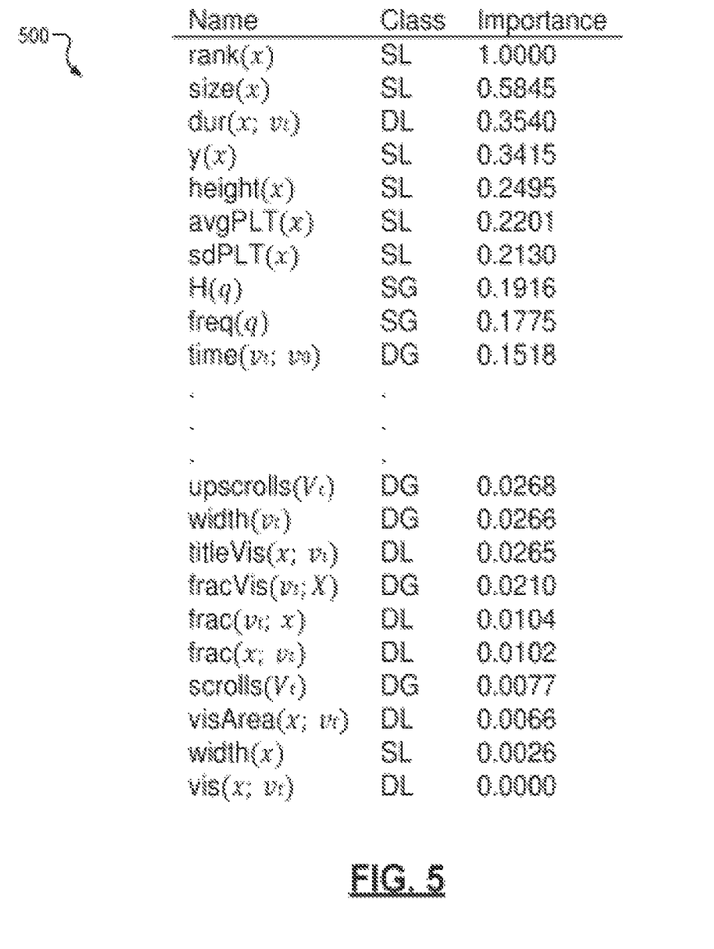
FIG. 5 is a table of relative importance assigned to respective features input to a prefetching model according to the present disclosure.

The prefetching model may consider only selected ones of the features, and/or the model may give more or less weight to each of the features based on historic performance of the model, the user, etc. For example, the model may be updated to give more or less weight to any of the features. In one example as shown in FIG. 5, a table 500 includes a respective "importance" determined for each of the features. For example, the importance is an indication of how strongly the feature is correlated to the user actually selecting a given search result. The prefetching model may be constructed to weigh the features according to the determined importance, and may be updated in response to the importance being modified. For example only, the prefetching model may be updated in response to a change in the importance of any of the features resulting in a reordering of the features in the table 500.

Although the prefetching model as discussed above calculates and assigns scores to the search results based on features related to viewport position, in some examples the prefetching model may also receive features based on cursor movement, eye movement, finger hover/position, etc. Accordingly, the prefetching model may incorporate features associated with multiple types of user interaction. For example only, features related to cursor movement may include static global features (e.g., query features such as query frequency, query click entropy, etc. and/or SERP features such as advertisements, related searches, etc.), dynamic global features (e.g., cursor velocity, acceleration, rate of acceleration change, location on the SERP, etc.), static local features (e.g., rank of each AOI, horizontal and vertical coordinates of the AOI, area of the AOI, etc.), and dynamic local features (e.g., interaction between cursor movement and each AOI, such as angle between movement direction of the cursor and the AOI, distance from the AOI, an indication of whether the AOI is within a trajectory of the cursor).

Figure 6:
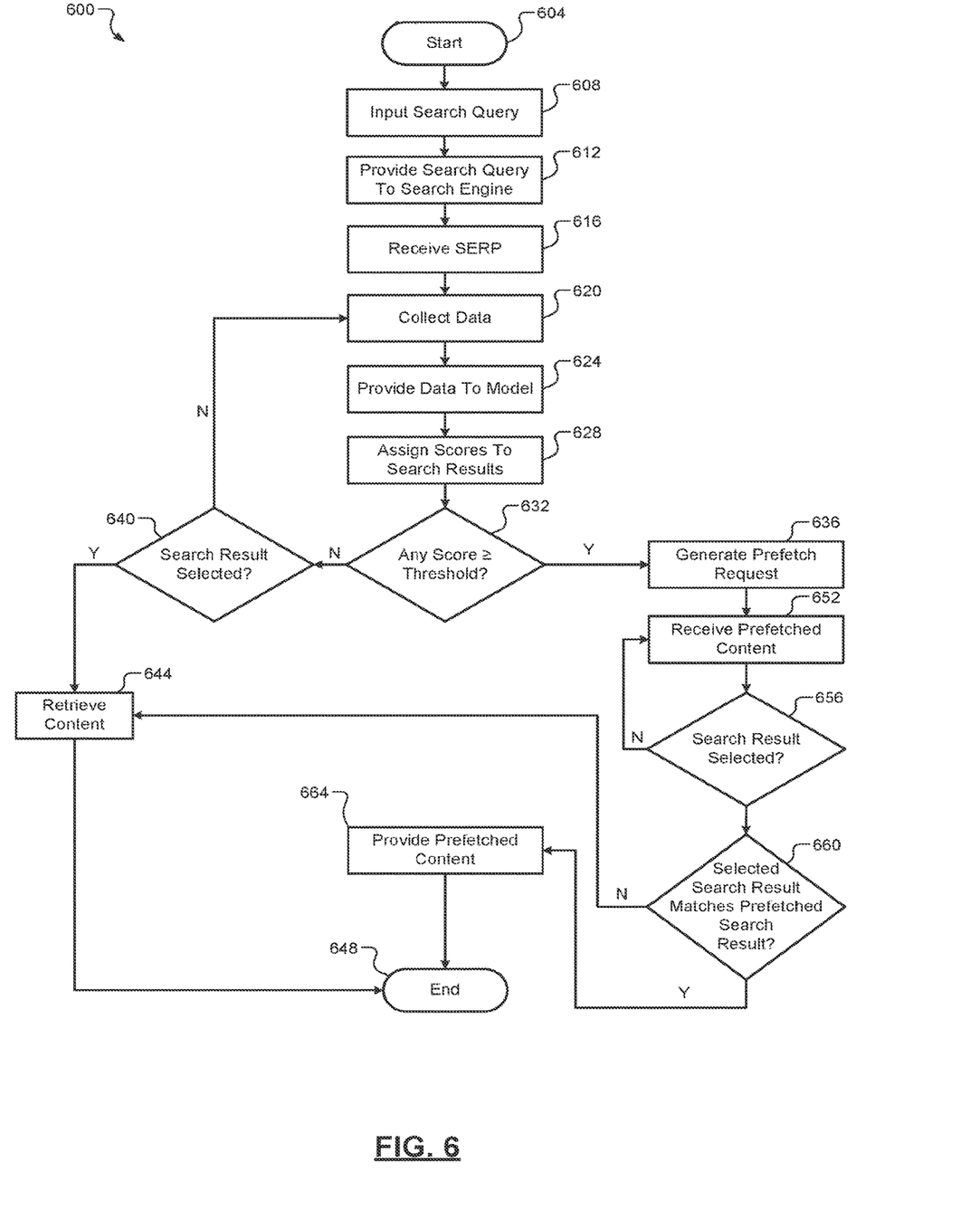
FIG. 6 is an example prefetching method according to the present disclosure.

Referring now to FIG. 6, an example prefetching method 600 starts at 604. At 608, a user inputs a search query into a search engine interface provided on a display of a device (e.g., a smartphone). At 612, the device provides the search query to a search engine. At 616, the device receives a SERP in response to the search query. At 620, the device collects data associated with the SERP, including both dynamic and static data as described above in FIGS. 1-5. At 624, the device provides features indicative of the data to a prefetching model. At 628, the prefetching model assigns scores to the search results on the SERP.

At 632, the device determines whether any of the search results has an assigned score greater than or equal to a prefetching threshold. If true, the method 600 continues to 636. If false, the method 600 continues to 640. At 640, the device determines whether the user has selected a search result. If true, the device generates a request to retrieve content associated with the selected search result at 644 and ends at 648. If false, the method 600 continues to 620 to continue to collect data and update the scores assigned to the search results.

At 636, the device generates a prefetch request to retrieve content associated with the search result having the score greater than or equal to the prefetch threshold. At 652, the device receives the prefetched content. At 656, the device determines whether the user has selected a search result. If true, the method 600 continues to 660. If false, the method 600 continues to 656. At 660, the device determines whether the search result selected by the user matches the prefetched search result. If true, the method 600 continues to 664. If false, the method 600 continues to 644 to retrieve the content associated with the selected search result. At 664, the method 600 provides the prefetched content to the user via the display of the device and ends at 648.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

In this application, apparatus elements described as having particular attributes or performing particular operations are specifically configured to have those particular attributes and perform those particular operations. Specifically, a description of an element to perform an action means that the element is configured to perform the action. The configuration of an element may include programming of the element, such as by encoding instructions on a non-transitory, tangible computer-readable medium associated with the element.

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

What is claimed is:

1. A method comprising:
   receiving a content page including links to selectable content at a device;
   displaying at least a portion of the content page within a viewport of the device;
   monitoring user interactions with the viewport that cause movement of or relative to the viewport;
   providing input comprising data indicative of the user interactions with the viewport that cause movement relative to the viewport to a prefetching model, the prefetching model being based on historic data, aggregated for a plurality of users, that associates movements relative to the viewport with link selection;
   operating the prefetching model on the input to assign, based on the input, scores to the links that predict a likelihood that a user will select the link, and to continuously adjust the scores as the user interacts with the viewport; and
   selectively prefetching content linked to by the links based on the scores.

2. The method of claim 1, wherein the movement relative to the viewport comprises movement of the content page relative to the viewport.

3. The method of claim 2, wherein the movement of the content page relative to the view port comprises a change relative to the content page of at least one of a position of the viewport, an orientation of the viewport, or a zoom level of the viewport.

4. The method of claim 2, wherein the data indicative of the user interactions comprises at least one of features associated with areas of interests of the links relative to current and past viewport positions, a time difference between current and past viewport positions, a distance between current and past viewport positions, a speed of movement between current and past viewport positions, or a number of scrolls performed by the user.

5. The method of claim 1, wherein the movement of or relative to the viewport comprises at least one of movement of a cursor within the viewport, the user's eye movement relative to the viewport, or the user's finger movement relative to the viewport.

6. The method of claim 1, wherein the input provided to the prefetching model further comprises user preferences or settings associated with the viewport.

7. The method of claim 1, wherein the input provided to the prefetching model further comprises at least one of a frequency with which each of the links was selected by other users, positions of the links, or fixed rankings of the links.

8. The method of claim 1, wherein the scores are based at least in part on respective times that the links are within the viewport.

9. The method of claim 1, wherein selectively prefetching content linked to by the links based on the scores comprises one of prefetching only content linked to by a link having a highest assigned score, or prefetching content linked to by a link having a score that exceeds a prefetch threshold.

10. The method of claim 1, further comprising:
    in response to selection of one of the links by the user, determining whether the selected link corresponds to the prefetched content;
    if the selected link corresponds to the prefetched content, retrieving the prefetched content from memory or data storage of the device and displaying at least a portion of the retrieved prefetched content to the user within the viewport; and
    if the selected link does not correspond to the prefetched content, retrieving the content linked to by the selected link from an information system in communication with the device.

11. The method of claim 10, further comprising:
    updating the prefetching model based on the determination.

12. The method of claim 1, wherein the content page is a search results page and the selectable content comprises search results.

13. A device comprising:
a communication interface to receive a content page including links to selectable content;
a display to display, within a viewport of the display, at least a portion of the content page; and
a control module to:
monitor user interactions with the viewport that cause movement relative to the viewport,
provide input comprising data indicative of the user interactions with the viewport that cause movement relative to the viewport to a prefetching model, the prefetching model being based on historic data, aggregated for a plurality of users, that associates movements relative to the viewport with link selection,
operate the prefetching model on the input to assign, based on the input, scores to the links that predict a likelihood that a user will select the link, and to continuously adjust the scores as the user interacts with the viewport, and
selectively prefetch content linked to by the links based on the scores.

14. The device of claim 13, wherein the movement relative to the viewport comprises movement of the content page relative to the viewport.

15. The device of claim 13, wherein the movement relative to the viewport comprises at least one of movement of a cursor within the viewport, the user's eye movement relative to the viewport, or the user's finger movement relative to the viewport.

16. The device of claim 13, wherein the communication interface is configured to receive the content page from an information system via a wired or wireless network connection.

17. The device of claim 16, further comprising:
at least one of memory or data storage to store the prefetched content,
wherein the control module is further configured to determine, in response to selection of one of the links by the user via a user interface of the device, whether the selected link corresponds to the prefetched content, to retrieve the selected content from the memory or data storage if the selected link corresponds to the prefetched content, and to retrieve the content linked to by the selected link via the communication interface from the information system if the selected link does not correspond to the prefetched content.

18. The device of claim 17, wherein the control module is further configured to update the prefetching model based on the determination.

19. A computer-readable medium storing instructions which, when executed by one or more processors, cause the one or more processors to perform operations comprising:
causing display, upon receipt of a content page including links to selectable content, of at least a portion of the content page within a viewport of a device;
monitoring user interactions with the viewport that cause movement relative to the viewport;
providing input comprising data indicative of the user interactions with the viewport that cause movement relative to the viewport to a prefetching model, the prefetching model being based on historic data, aggregated for a plurality of users, that associates movements relative to the viewport with link selection;
operating the prefetching model on the input to assign, based on the input, scores to the links that predict a likelihood that a user will select the link, and to continuously adjust the scores as the user interacts with the viewport; and
selectively prefetching content linked to by the links based on the scores.

20. The computer-readable medium of claim 19, wherein the movement relative to the viewport comprises at least one of movement of the content page relative to the viewport, movement of a cursor within the viewport, the user's eye movement relative to the viewport, or the user's finger movement relative to the viewport.

* * * * *